(12) United States Patent
Del Villar et al.

(10) Patent No.: US 12,169,526 B2
(45) Date of Patent: Dec. 17, 2024

(54) GENERATING AND PRESENTING A TEXT-BASED GRAPH OBJECT

(71) Applicant: Microsoft Technology Licensing, LLC, Redmond, WA (US)

(72) Inventors: Paul Pangilinan Del Villar, Bothell, WA (US); Xiaofei Zeng, Redmond, WA (US); Mingyang Xu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 277 days.

(21) Appl. No.: 17/484,670

(22) Filed: Sep. 24, 2021

(65) Prior Publication Data
US 2023/0112763 A1     Apr. 13, 2023

(51) Int. Cl.
    *G06F 16/906*     (2019.01)
    *G06F 16/901*     (2019.01)

(52) U.S. Cl.
    CPC ........ *G06F 16/906* (2019.01); *G06F 16/9024* (2019.01)

(58) Field of Classification Search
None
See application file for complete search history.

(56) References Cited

U.S. PATENT DOCUMENTS

| | | | | |
|---|---|---|---|---|
| 9,183,203 | B1* | 11/2015 | Tuchman | G06F 16/3347 |
| 11,288,542 | B1* | 3/2022 | Samplawski | G06N 3/08 |
| 2002/0042792 | A1* | 4/2002 | Nishioka | G06F 16/30 |
| | | | | 707/999.005 |
| 2013/0138696 | A1* | 5/2013 | Turdakov | G06F 16/367 |
| | | | | 707/794 |
| 2014/0136184 | A1* | 5/2014 | Hatsek | G06F 40/295 |
| | | | | 704/9 |
| 2014/0222835 | A1* | 8/2014 | Lee | G06F 16/24578 |
| | | | | 707/755 |

(Continued)

OTHER PUBLICATIONS

Wang, Wei, et al. "A survey of zero-shot learning: Settings, methods, and applications." ACM Transactions on Intelligent Systems and Technology (TIST) 10.2 (2019): 1-37. (Year: 2019).*

(Continued)

*Primary Examiner* — Alex Gofman
*Assistant Examiner* — Umar Mian
(74) *Attorney, Agent, or Firm* — Ray Quinney & Nebeker; James Bullough

(57) ABSTRACT

The present disclosure relates to extracting key concepts from digital content items and determining associations between the key concepts and candidate terms for use in generating and presenting a correlation graph object based on the determined associations. For example, systems described herein involve determining frequency of co-occurrence between various key concepts and applying a classification model (e.g., a zero-shot classification model) to the key concepts and candidate terms to determine associations between the key concepts and candidate terms for a given domain of interest. The systems further involve generating a graph object and processing graph queries in a way that enables fast and efficient presentation of slices of the graph object that provide a visual depiction of key concepts and edges representing associations between pairs of the key concepts.

19 Claims, 6 Drawing Sheets

(56) References Cited

U.S. PATENT DOCUMENTS

| | | | | |
|---|---|---|---|---|
| 2014/0351267 | A1* | 11/2014 | Kumar | G06F 18/2323 |
| | | | | 707/748 |
| 2016/0203221 | A1* | 7/2016 | Rao | G06Q 50/01 |
| | | | | 707/707 |
| 2017/0140117 | A1* | 5/2017 | Haddad | G16Z 99/00 |
| 2017/0161619 | A1* | 6/2017 | Franceschini | G06N 5/022 |
| 2018/0253830 | A1* | 9/2018 | Courtney | G06T 5/002 |
| 2019/0005052 | A1 | 1/2019 | Ura | |
| 2019/0303703 | A1* | 10/2019 | Kumar | G06V 10/82 |
| 2021/0165971 | A1* | 6/2021 | Lee | G06F 40/47 |
| 2021/0357281 | A1* | 11/2021 | Malboubi | G06F 16/285 |
| 2022/0068153 | A1* | 3/2022 | Harlow | G06F 40/30 |
| 2022/0358293 | A1* | 11/2022 | Renard | G06F 16/353 |
| 2023/0289597 | A1* | 9/2023 | R | G06N 3/08 |

OTHER PUBLICATIONS

"Zero-shot learning." deepchecks AI. Published Sep. 19, 2021. Retrieved Feb. 26, 2024 via the Internet Archive Wayback Machine at https://web.archive.org/web/20210919181024/https://deepchecks.com/glossary/zero-shot-learning/ (Year: 2021).*

Xian, Yongqin, et al. "Zero-shot learning—a comprehensive evaluation of the good, the bad and the ugly." IEEE transactions on pattern analysis and machine intelligence 41.9 (2018): 2251-2265. (Year: 2018).*

"International Search Report and Written Opinion Issued in PCT Application No. PCT/US22/042571", Mailed Date: Dec. 1, 2022, 12 Pages.

* cited by examiner

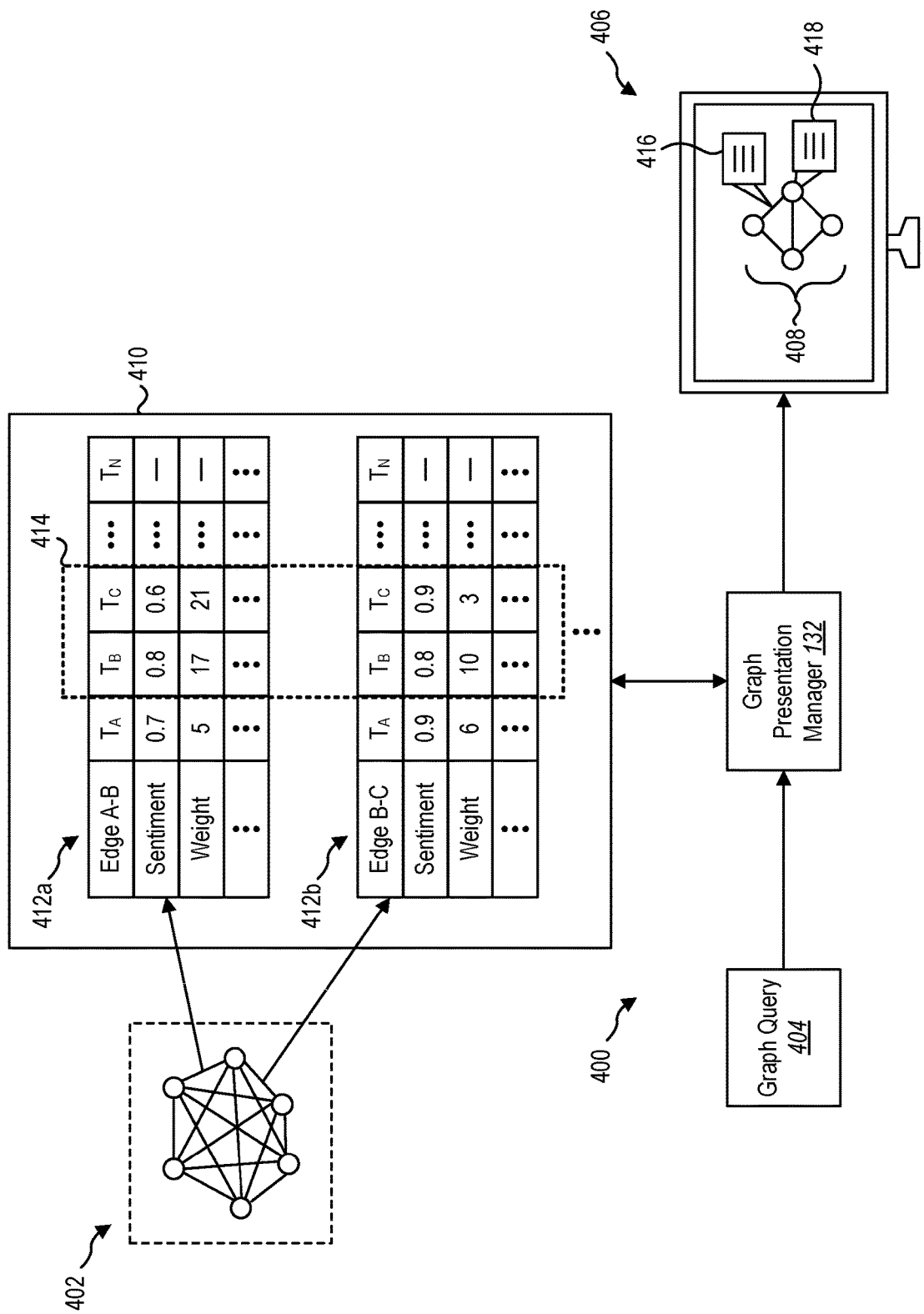

GENERATING AND PRESENTING A TEXT-BASED GRAPH OBJECT

BACKGROUND

Recent years have seen a significant increase in the use of computing devices (e.g., mobile devices, personal computers, server devices) to create, store, analyze, and present data from various sources. Indeed, tools and applications for collecting, analyzing, and presenting data are becoming more and more common. These tools provide a variety of features for displaying data about various concepts and entities of interest. As tools for collecting, analyzing, and searching databases become more complex, however, conventional methods for collecting, analyzing, and presenting data present a number of limitations and drawbacks.

For example, conventional techniques for collecting, analyzing, and presenting data often rely on focus groups and surveys for collection and analysis of data. Other techniques may require that specific content or text have a particular format or that the relevant content originate and/or publish from a specific platform (e.g., a social networking platform). Each of these techniques generally involve significant costs as a result of time and manpower needed to collect sufficient data and gain meaningful insights. Moreover, conventional techniques for collecting, analyzing, and presenting data are often limited to a specific snapshot at a given time period and becomes obsolete over time.

These and other problems exist in connection with collecting, analyzing, and presenting data.

BRIEF DESCRIPTION OF THE DRAWINGS

FIG. 4 illustrates an example implementation in which pre-calculated segments of a graph object are identified and presented in accordance with one or more embodiments.

DETAILED DESCRIPTION

Figure 1:
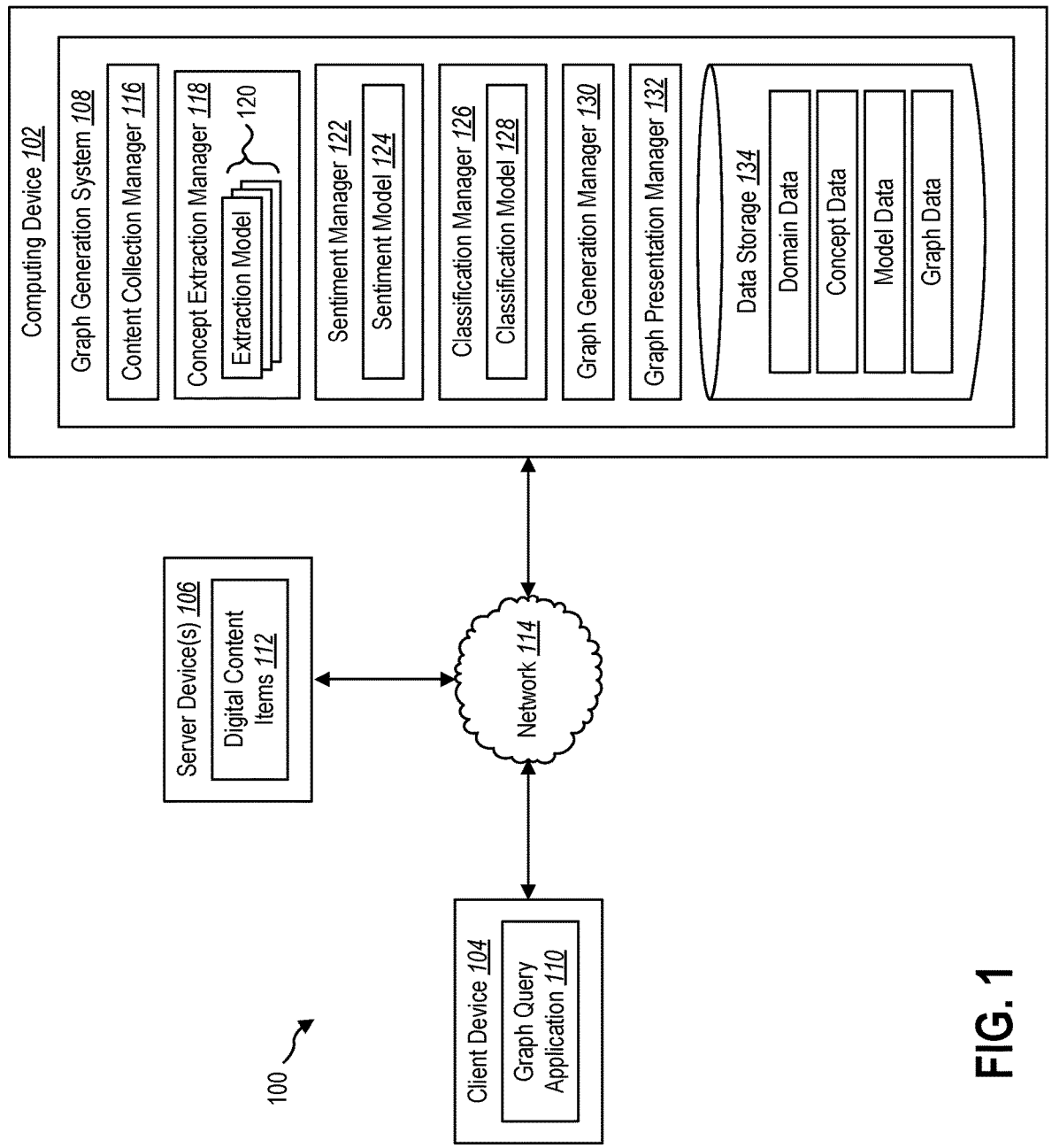
FIG. 1 illustrates an example environment including a graph generation system in accordance with one or more embodiments.

The present disclosure relates to systems and models for extracting key concepts (e.g., terms) from a collection of digital content items and determining associations between the key concepts based on co-occurrences within the digital content items, sentiment scores associated with the digital content items, and associations that are identified between the key concepts and candidate terms from a particular domain of interest. In one or more embodiments described herein, extraction model(s) including a combination of rule-based and machine learning models may be used to identify key concepts from text content originating from one or more platforms (e.g., social media platforms). One or more embodiments described herein further involve a classification model (e.g., a zero-shot classification model) that identifies associations between the extracted key concepts and candidate terms.

The systems described herein may further generate a graph object including nodes and edges representative of concepts and associations between concept-pairs based on detected co-occurrences of the various key concepts within the collection of digital content items. As will be discussed in further detail below, the systems described herein may further provide a mechanism for receiving and processing graph queries and presenting portions of the graph object based on the determined associations as well as associations between key concepts and candidate terms for a domain space.

As an illustrative example, and as will be discussed in further detail below, a graph generation system may extract a plurality of key concepts from a collection of digital content items. The graph generation system may further receive a set of candidate terms associated with a domain of interest. In one or more embodiments, the graph generation system may apply a classification model to the key concepts and candidate terms to determine, for each key concept, a candidate term associated therewith. The graph generation system may further generate a correlation graph object for the collection of digital content items including a plurality of nodes for the plurality of key concepts connected according to key concept pairs based on co-occurrence of the key concepts within the digital content items. As will be discussed in further detail below, the nodes may further include indications of candidate terms associated with the respective key concepts in a way that enables the graph generation system and/or graph search application to provide a presentation of a portion of the graph object including those nodes for respective key concepts that are identified based on the graph search query.

The present disclosure provides a number of practical applications that provide benefits and/or solve problems associated with extracting concepts from a collection of digital content items, generating a searchable graph object, and providing a presentation including selective portions of the graph object responsive to a graph query. By way of example and not limitation, some of these benefits will be discussed in further detail below.

For example, the graph generation system provides features and functionality that enables identifying, analyzing, and presenting associations between key concepts that are extracted from digital content items. Indeed, where focus groups and surveys have been used in the past to gain insights and identify key concepts within text of digital content items, the graph generation system utilizes a number of models to identify relevant portions of text within the digital content items and, based on the identified relevant portions of text, identifying key concepts found within text of the digital content items. The graph generation system further overcomes the need for expensive and time-consuming focus groups by implementing models trained to determine associations between the key concepts and domain-specific terms as well as generate a searchable graph object in accordance with one or more embodiments described herein.

In addition to reducing the expense of focus groups and human analysis of the digital content items, the graph generation system further implements models that are trained to extract key concepts from digital content items across a wide variety of computing platforms. For example, where many social networking platforms have specific formats and implement in-house search tools that are exclusively effective to the specific social networking platform, the graph generation system provides an extraction model that makes use of a combination of rule-based algorithms and machine learning models to extract key concepts from text independent of content format or a platform from which the digital content items originate.

As will be discussed below, the graph generation system further provides flexibility in connection with a wide variety of domains of interest that may be considered in determining associations between the key concepts and various domain-specific terms. Indeed, an individual or organization may provide a set of candidate terms associated with any domain of interest and use a classification model trained to determine associations between each of the key concepts and one or more of the candidate terms. In one or more embodiments, the graph generation system accomplishes this flexibility across a wide variety of domains by utilizing a zero-shot classification model trained to predict or otherwise determine associations between key concepts and candidate terms based on general knowledge and training without specifically training the classification model for the domain-specific candidate terms.

As will be discussed in further detail below, the graph generation system may efficiently use computing resources by generating a graph object representative of selective key concepts from the collection of digital content items. For example, as will be discussed in further detail below, the graph generation system can selectively identify only those key concepts that are associated with a set of candidate terms and filter out additional concepts and/or digital content items from consideration in generating the searchable graph object. In this way, the graph object may include nodes and edges that are unique to the domain of interest and exclude large quantities of digital content items when processing graph queries and presenting query results.

In addition to the above, the graph generation system provides a dynamic approach that enables dynamic updating of the graph object as well as presenting slices of the graph object representative of digital content items collected over various segments of time. For example, in one or more embodiments discussed below, the graph object may determine correlation values indicating various weights, sentiments, and associations for specific segments of time. The graph generation system may further provide a mechanism where slices of the graph object are presented for an indicated duration of time without causing the graph generation system to generate a new graph object or process massive quantities of digital content items on the fly to determine time-specific results. In addition, the graph generation system may iteratively update the graph object based on recently collected digital content items without recreating the entire graph object after each individual predetermined segment of time. This approach to iteratively updating the graph object as well as enabling a graph query to indicate a relevant duration of time provides accurate results while significantly reducing processing expenses associated with generating and searching the graph object.

As illustrated in the foregoing discussion, the present disclosure utilizes a variety of terms to describe features and advantages of one or more embodiments of a graph generation system. Additional detail will now be provided regarding the meaning of some of these terms. Further terms will also be discussed in further detail in connection with one or more embodiments and specific examples below.

As used herein, a "digital content item" or "content item" may refer to a defined portion of digital data (e.g., a data file). Examples of digital content items include digital images, video files, audio files, streaming content, and/or folders that include one or more digital content item. In one or more embodiments described herein, a digital content item refers specifically to a content item having text associated therewith. For example, a digital content item may include a social media post that includes text alone or in combination with audio and/or visual content. In one or more embodiments, a digital content item may refer to a document, blog post, a user comment, a review, or any other digital content that is accessible to the graph generation system and which includes a string of text that may be analyzed, parsed, or otherwise processed in accordance with one or more embodiments described herein.

As noted above, the graph generation system may receive or otherwise collect digital content items from a social networking system or platform. As used herein, a "social networking system" or "social networking platform" may refer to any communication platform on which digital content items can be stored and shared between users of the communication platform. In one or more embodiments, digital content items may be collected from a set of digital content items that have been posted publicly or that have been made accessible publicly to other users of the social networking system.

As used herein a "key concept" or "key concept term(s)" may refer to one or more terms and/or abstract concepts that are determined to be associated with a digital content item. In one or more embodiments, a key concept refers to terms or portions of text that are explicitly included within a digital content item. In one or more embodiments, a key concept refers to a topic, idea, or identifiable aspect associated with text of a digital content item. In one or more embodiments, a key concept refers to a hashtag or other searchable object within the digital content item. It will be understood that digital content items may include any number of key concepts (or ideas represented by key concepts) therein. In addition, where a content item includes a lot of text including multiple sentences or paragraphs, the content item may be considered multiple digital content items corresponding to specific sentences, paragraphs, or any discrete portion(s) of the shared content item.

While one or more embodiments described herein may refer to terms that are represented within a digital content item (e.g., text content of a digital content item), it will be understood that a key concept may refer more generally to an idea, a thing, a notion, or other abstract concept associated with a given digital content item. Thus, in one or more embodiments described herein, a key concept may refer to specific terms themselves and/or more abstract concepts represented by a set of terms. To illustrate, while a key concept may refer to an object or topic that is explicitly discussed within a given set of text, a key concept may also refer to a mood or tone of the text as well as any other concept(s) represented within a digital content item. Accordingly, in one or more embodiments described herein, a key concept may refer to one or more terms that are representative of ideas, things, notions, or other abstract concepts identified in association with a digital content item.

As used herein, "candidate terms" may refer to any number of terms that are received in connection with a domain of interest. As used herein, a domain of interest may refer to any topic or subject for which an individual or organization is interested in understanding, particularly in the context of key concepts that are extracted from digital content items. As will be discussed below, the graph generation system may receive a set of candidate terms referring to a set of terms that are received in connection with a particular organization or general topic. For instance, where a domain of interest refers to "basketball," a set of candidate terms may include, by way of example and not limitation, "basketball court," "fans," "hoops," "shoes," "foul," "guard," "forward," and any other terms that an individual, organization, or other entity provides in connection with the domain of interest related to "basketball."

Additional detail will now be provided regarding a graph generation system in accordance with one or more example implementations. For example, FIG. 1 illustrates a block diagram showing an environment 100 having one or more computing device(s) 102 on which a graph generation system 108 may be implemented in accordance with one or more embodiments. The environment 100 further includes a client device 104 having a graph query application 110 thereon and one or more server device(s) 106 providing access to a collection of digital content items 112 (e.g., publicly accessible digital content items shared via one or more social networking systems).

As shown in FIG. 1, the computing device(s) 102, client device 104 and server device(s) 106 may communicate with each other directly or indirectly through a network 114. The network 114 may include one or multiple networks and may use one or more communication platforms or technologies suitable for transmitting data. The network 114 may refer to any data link that enables the transport of electronic data between devices and/or modules of the environment 100. The network 114 may refer to a hardwired network, a wireless network, or a combination of hardwired and wireless networks. In one or more embodiments, the network 114 includes the Internet The computing device(s) 102, client device 104, and/or server device(s) 106 may refer to various types of computing devices. For example, in one or more embodiments, the client device 104 may include a mobile device, such as a mobile telephone, a smartphone, a PDA, a tablet, or a desktop. In one or more embodiments, the client device 104 may include a non-mobile device such as a desktop computer, server device, or other non-portable device. In one or more embodiments described herein, the computing device(s) 102 refers to one or more server devices of a cloud computing system accessible to a client device 104 operated by a user. In one or more implementations, the server device(s) 106 refers to one or more third-party server device(s) independent from the computing device(s) 102. Each of the computing device(s) 102, client device 104, and server device(s) 106 may include features and functionality described below in connection with FIG. 6.

As shown in FIG. 1, and as will be discussed in further detail below, the graph generation system 108 may include a number of components for performing various acts and providing functionalities described herein. By way of example, the graph generation system 108 may include a content collection manager 116 and a concept extraction manager 118, which may include multiple extraction models 120. As further shown, the graph generation system 108 may include a sentiment manager 122 having a sentiment model 124 thereon. The graph generation system 108 may further include a classification manager 126 having a classification model 128 (e.g., a zero-shot classification model) thereon. The graph generation system 108 may further include a graph generation manager 130 and a graph presentation manager 132. The graph generation system 108 may further include a data storage 134 that provides access to various types of data to other components of the graph generation system 108.

It will be understood that while FIG. 1 illustrates an example in which each of the components 116-134 are implemented in whole on the computing device(s) 102, other implementations may include one or more components (or sub-components) implemented across difference devices of the environment 100. As a non-limiting example, one or more of the concept extraction manager 118, sentiment manager 122, and/or classification manager 126 may be implemented on different computing devices (e.g., on different server nodes of a cloud computing system). As another example, while FIG. 1 shows an example in which a graph query application 110 on the client device 104 may perform features related to processing a graph query and providing a presentation of a query result, in one or more embodiments, the graph presentation manager 132 may incorporate some or all of the features discussed in connection with the graph query application 110. Thus, while one or more embodiments described herein will be discussed in connection with a similar configuration of devices as shown in the environment 100, features and functionality of the systems and applications described herein may similarly apply to other device environments.

As mentioned above, and as will be discussed in further detail below, the graph generation system 108 may include a content collection manager 116. The content collection manager 116 can collect or otherwise obtain access to text content from a collection of digital content items 112. For example, in one or more embodiments, the content collection manager 116 collects or otherwise accesses digital content items from a social networking system hosted by the server device(s) 106. In one or more embodiments, the content collection manager 116 collects digital content items from a plurality of social media platforms shared by users of the respective platforms. As noted above, the digital content items may have different formats or combinations of text content and visual content (e.g., images, videos). Nevertheless, in one or more embodiments, the content collection manager 116 obtains access to text portions of various digital content items for use in further processing by the graph generation system 108. In one or more embodiments described herein, the content collection manager 116 exclusively collects digital content items that have been made publicly accessible by individuals that uploaded or otherwise shared the digital content items to other users of the social network system(s).

As shown in FIG. 1, the graph generation system 108 may further include a concept extraction manager 118. Upon receiving the collection of digital content items (or simply receiving the text content from the digital content items), the concept extraction manager 118 can apply one or more models to the text content of the digital content items to identify one or more key concepts therein. As indicated above, the concept extraction manager 118 may identify one or multiple key concepts within a given digital content item including topics, ideas, or other aspects that are referenced, discussed, or otherwise included within a digital content item. A key concept may refer to text that is explicitly included within the digital content item. Alternatively, a key concept may refer to topics, ideas, or other aspects that are inferred or referenced within a digital content item. In one or more embodiments, a key concept refers to a searchable object, such as a hashtag, expressed within or in connection with a digital content item.

In one or more embodiments, the concept extraction manager 118 may extract key concepts by applying multiple extraction models 120 to the text content of the digital content items. For example, in one or more embodiments, the concept extraction manager 118 may include a first extraction model applied to the text content of the digital content item(s). In one or more implementations, the first extraction model is a rule-based model including algorithm(s) for identifying certain types of terms within the text content. For example, the rule-based model may be trained to identify nouns, verbs, hashtags, and other terms expressed within a digital content item. In one or more embodiments, the concept extraction manager 118 tags the identified terms for use by one or more additional models of the concept extraction manager 118. For example, in one or more embodiments, the concept extraction manager 118 adds metadata to the digital content item indicating terms and associated types for use by one or more additional extraction models.

In one or more embodiments, the concept extraction manager 118 may additionally include a second extraction model trained to extract key concepts from the text content of the digital content items in view of the terms flagged or otherwise indicated by the first extraction model. In one or more embodiments, the second extraction model includes a deep learning model or other machine learning model that has been trained to predict, estimate, or otherwise output key concepts within text content in view of various types of terms that are indicated within the text content. In this example, the second extraction model may output one or more key concepts within a given portion of text, such as within a social networking post, a sentence, a paragraph, or other discrete portion of a digital content item.

As noted above, the applies the extraction models 120 to text portions of the digital content items. Also noted above, in one or more embodiments, the digital content items may refer to a variety of data objects (or portions thereof) including text content, such as social media posts, blog posts, published articles, websites, or any other digital content including text. In one or more embodiments, the concept extraction manager 118 identifies key concepts within discrete portions of larger quantities of text (e.g., multiple sentences, paragraphs, pages, tables) of digital content items. In accordance with one or more embodiments described herein, co-occurrence of various key concepts may be considered for entire digital content items or for discrete portions of text within the same digital object.

As further shown in FIG. 1, the graph generation system 108 may include a sentiment manager 122 having a sentiment model 124 thereon. As will be discussed in further detail below, the sentiment manager 122 may apply a sentiment model 124 to the collection of digital content items to determine a metric of sentiment for the respective digital content items. In one or more embodiments, the sentiment manager 122 utilizes a sentiment model 124 that has been trained to predict a sentiment associated with the corresponding digital content item. The sentiment manager 122 may apply the sentiment model 124 to each digital content item from the collection of digital content items to determine a sentiment score (e.g., from 0 to 1) indicating a level of sentiment for the respective digital content items.

In one or more embodiments, the sentiment manager 122 may accumulate sentiment scores across the digital content items to determine sentiment scores for the key concepts extracted from the digital content items. For example, in one or more embodiments, the sentiment manager 122 averages, normalizes, or otherwise accumulates sentiment scores from each digital content item for which a specific key concept has been extracted and determines a composite sentiment score for the key concept. In addition, or as an alternative, in one or more embodiments, the sentiment manager 122 accumulates sentiment scores for pairs of concepts that co-occur within respective digital content items from the collection of digital content items. As will be discussed in further detail below, these accumulated sentiment scores associated with key concepts (and/or pairs of concepts) may be used in generating a correlation graph object and included within nodes and/or edges of the generated object(s).

As shown in FIG. 1, the graph generation system 108 also includes a classification manager 126 having a classification model 128 thereon. As will be discussed in further detail below, the classification manager 126 may apply the classification model 128 to the key concepts and associated candidate terms to determine associations between the key concepts and corresponding candidate terms. In one or more embodiments, the classification manager 126 determines an association between each of the key concepts and an associated candidate term.

As noted above, the candidate terms may refer to any number of terms that are received in connection with a domain of interest. For example, the candidate terms may include terms that are determined by a user, organization, or any domain expert and provided to the classification manager 126 for use in determining associations between the extracted key concepts from the digital content items and the respective terms from the received candidate terms.

In one or more embodiments, the classification manager 126 applies a classification model 128 that has been trained to associate a first set of terms with a second set of terms. In particular, in one or more implementations, the classification model 128 refers to a zero-shot classification model that has been trained based on any number of general terms without any specific connection to one or more unique domains. In this way, the classification model 128 may be implemented in connection with a particular domain of interest without specifically training the classification model 128 to associate candidate terms from that domain and corresponding key concepts.

While using a zero-shot model may be slightly less accurate at predicting associations than a uniquely trained machine learning model for a particular domain, using a zero-shot classification model in this fashion enables the classification manager 126 to associate key aspects extracted from any collection of digital content items with sets of candidate terms across a wide variety of domains. Moreover, using a zero-shot classification model in connection with one or more embodiments enables a user, individual, organization, or other entity to iteratively update a set of candidate terms for a domain based on a changing landscape of a particular domain or to simply add or remove one or more terms from a set of candidate terms.

As further shown in FIG. 1, the graph generation system 108 may include a graph generation manager 130 for generating a correlation graph object in accordance with one or more embodiments described herein. In one or more embodiments, the graph generation manager 130 receives the extracted key concepts, domain terms, associations between the concepts and terms, and sentiment scores for the digital content items as discussed above. Further, in one or more implementations, the graph generation manager 130 receives (e.g., from the concept extraction manager 118) an indication of co-occurrence frequency between the key concepts and other key concepts extracted from the collection of digital content items. Alternatively, in one or more embodiments, the graph generation manager 130 calculates or otherwise determines frequency with which various key aspects co-occur within the digital content items.

Based on some or all of the above information, the graph generation manager 130 may generate a correlation graph object including a plurality of nodes representative of the key concepts and including additional data therein. In one or more embodiments, the graph generation manager 130 generates an object including a table or other data object that contains a structure of information gathered by the various components of the graph generation system 108. For example, as will be discussed below, the graph generation manager 130 may construct a matrix or table including an indication of key concepts, an indication of co-occurrence of the key concepts with one another (e.g., co-occurrence of key concept pairs), sentiment scores associated with the respective key concepts and key-concepts pairs, and associations between the key concepts and corresponding candidate terms from the domain-specific candidate terms. As will be discussed in further detail below, the various scores and indicators may be associated with corresponding time stamps, which may affect the metrics of weight and sentiment (and other correlation values) at different periods of time.

In one or more embodiments, the graph generation manager 130 generates a graph object based on the above-information including a plurality of nodes and edges representative of the key concepts, candidate terms, and correlation value(s). As used herein, a correlation value may refer to one or more values associated with sentiment, frequency of co-occurrence, and/or other signals that may be viewed individually or in combination to determine a weight or other relationship metric between corresponding pairs of key concepts. Indeed, where two particular key concepts occur with high frequency and/or where the two key concepts have a high sentiment value associated therewith, the key concepts may have a high combined correlation value (or multiple high correlation values associated with individual metrics).

As noted above, and as will be discussed in further detail below, the correlation graph object may include a plurality of nodes. Each of the nodes may refer to a corresponding key concept and have associated values and metrics associated therewith based on information from the matrix or table representative of the key concepts, candidate terms, and corresponding correlation values. For example, in one or more embodiments, each node may refer to a key concept and include an indication of a candidate term that is most closely associated therewith based on an output of the classification model 128.

In addition to generally representing a key concept, each node may be associated with one or more additional nodes based on co-occurrence of other key concepts with the key concept for the node within the collection of digital content items. Accordingly, each node may be associated with any number of additional nodes based on the key concept for the node appearing within one or more digital content items as key concepts for the additional nodes. In one or more embodiments, each node may additionally include a sentiment value associated therewith based on a cumulation of sentiment values corresponding to digital content items within which a key concept appears corresponding to the node.

As will be discussed in further detail below, the correlation graph object may additionally include any number of edges connecting the nodes to one another. For example, each edge may correspond to a pair of nodes based on co-occurrence of pairs of key concepts (associated with the pair of nodes) within respective digital content items from the collection of digital content items. In one or more embodiments, the edges may be associated with the correlation values discussed above. For example, each edge may include a weight, sentiment value, and one or more additional metrics representative of various associations between the respective nodes that are connected by the edge. Each node may include a plurality of edges connecting a given node to any number of additional nodes within the correlation graph object.

In one or more embodiments, the graph generation manager 130 generates a correlation graph object including slices or temporal portions that represent subsets of the correlation graph object. For example, in one or more embodiments, the graph generation manager 130 generates the correlation graph object and maintains subsets of data (e.g., subsets of correlation values) associated with discrete time intervals over a larger period of time corresponding to a time when the digital content items were created, shared, or collected. For instance, the graph generation manager 130 may determine and maintain correlation values for each of the edges and/or nodes of the correlation graph object. In one or more embodiments, the graph generation manager 130 pre-calculates the correlation values and other information associated with edges and/or nodes for the time intervals, which may be used in processing graph queries and providing a presentation of the graph object for an indicated duration of time. In one or more embodiments, the time intervals are fixed time intervals (e.g., weekly intervals, monthly intervals). Additional information in connection with maintaining and analyzing slices of the correlation graph object will be discussed below in connection with FIG. 4.

As shown in FIG. 1, the graph generation system 108 may further include a graph presentation manager 132. In one or more embodiments, the graph presentation manager 132 receives and processes a graph query. The graph presentation manager 132 may further generate and provide a presentation of the correlation graph object (or specific slice of the graph object) in response to the graph query. In one or more embodiments, the graph query includes an indication of any number of key concepts and/or candidate terms. In one or more embodiments, the graph query includes an indication of one or more candidate terms. Further, in one or more implementations, the graph query includes an indicated time range. Additional information in connection with receiving and processing graph queries will be discussed below in connection with non-limiting examples shown in FIGS. 3A-3B.

As noted above, FIG. 1 illustrates an implementation in which the graph presentation manager 132 is implemented on the graph generation system 108 on a computing device(s) 102 with a graph query application 110 being implemented on a client device 104. It will be appreciated that different embodiments may involve performing different acts of receiving and processing a graph query as well as generating and providing a presentation on one or across both of the graph presentation manager 132 and graph query application 110. For example, in one or more embodiments, graph generation manager 130 may generate a correlation graph object and provide the correlation graph object with associated information to the client device 104. In this example, the graph query application 110 may locally receive and process graph queries as well as generate and provide a presentation of the graph query results via a graphical user interface of the client device 104.

Alternatively, in one or more embodiments, the graph presentation manager 132 may host a presentation service in which the graph presentation manager 132 receives and processes graph queries on the computing device(s) 102. In addition, based on the graph query, the graph presentation manager 132 can generate and provide a presentation for display on a graphical user interface of the client device 104. In this example, the graph query application 110 may range from a specialized application capable of performing one or more acts of the graph presentation manager 132 discussed herein to a web browser that simply provides access to services performed by the graph presentation manager 132. In one or more embodiments, the graph presentation manager 132 (and other components of the graph generation system 108) may refer to cloud computing services provided by a cloud computing system on which the computing device(s) 102 is implemented.

Figure 2:
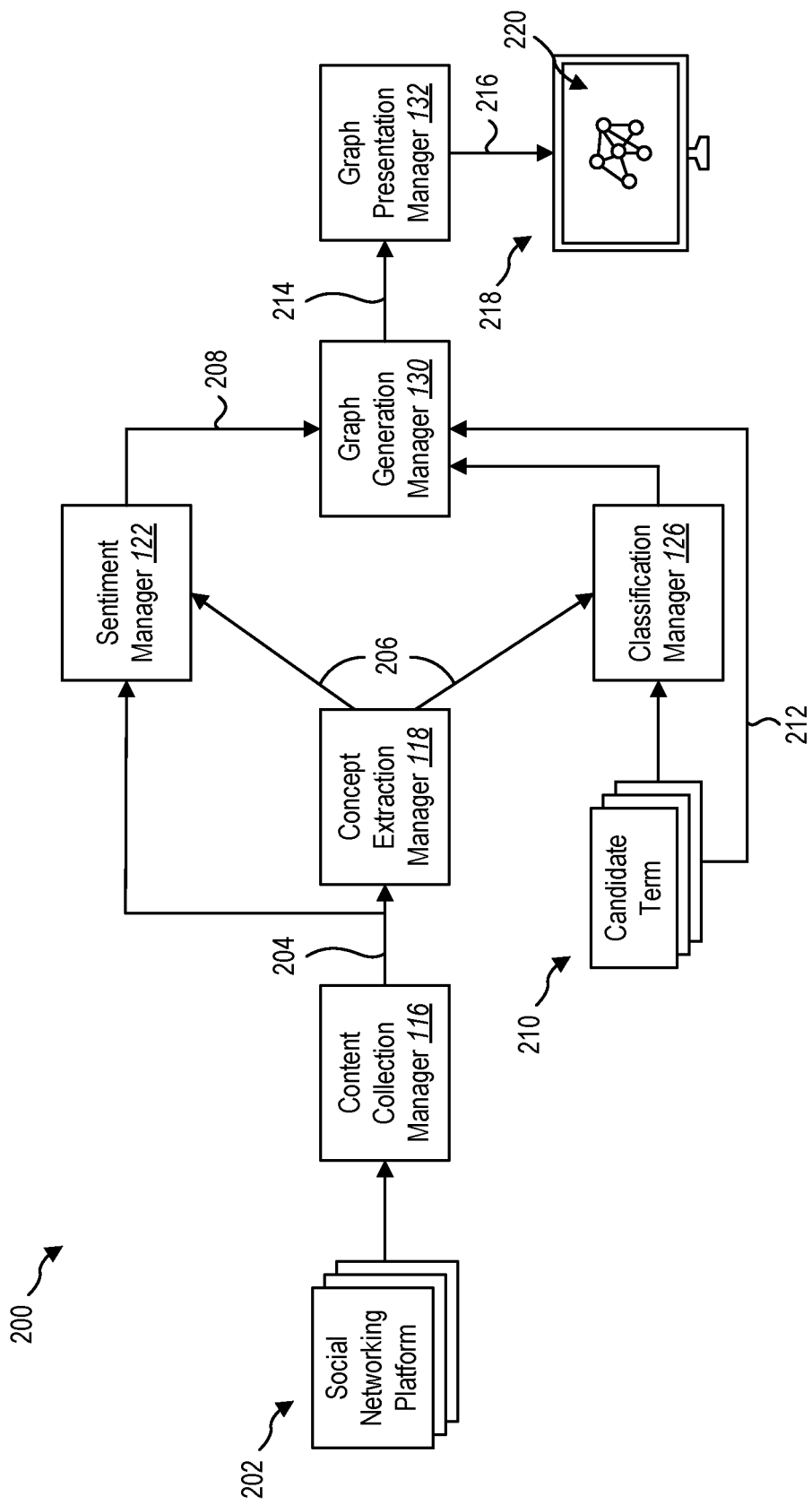
FIG. 2 illustrates an example workflow showing an implementation in which the graph generation system generates and provides a correlation graph object for display on a graphical user interface of a client device.

As further shown in FIG. 2, the graph generation system 108 may include a data storage 134 including various types of information. For example, the data storage 134 may include domain data. The domain data may include any information associated with a corresponding domain of interest. For example, the domain data may include any number of candidate terms that are provided in connection with a domain of interest. As noted above, the candidate terms may include terms that are generated for a specific domain by an individual or based on observed trends in connection with one or more specific key concepts.

As further shown, the data storage 134 may include concept data. The concept data may include any information associated with the key concepts that are extracted from the digital content items. For example, the concept data may include a listing of terms, topics, hashtags, or other indicators of key concepts that may be considered in creating the correlation graph object. In one or more embodiments, the concept data may include information about how frequently the specific key concepts and/or pairs of key concepts occur within the digital content items. For example, the concept data may include information associated with frequency of co-occurrence of the various key concepts.

As further shown, the data storage 134 may include model data. The model data may include any information associated with the various models used in processing the digital content items, determining correlation values, and generating the correlation graph model. For example, the model data may include information associated with any of the extraction models including the rule-based algorithms and/or machine learning models used for extracting key concepts. The model data may additionally include information associated with the sentiment model including algorithms and deep learning models for determining a sentiment for a given digital content item. The model data may further include information associated with the classification model (e.g., the zero-shot classification model) including any of the deep learning models and algorithms used for determining associations between key concepts and candidate terms.

The data storage 134 may also include graph data. In one or more embodiments, the graph data includes any information associated with the respective nodes and/or edges that make up a graph object. For example, the graph data may include correlation values and associations between key concepts and candidate terms. The graph data may further include any information that makes up the graph object including timing data, node data, and edge data that may surface in response to a given graph query.

Additional detail will now be discussed in connection with an example workflow 200 illustrated in FIG. 2. In particular, FIG. 2 illustrates an example workflow 200 including acts that may be performed by components of the graph generation system 108 in accordance with one or more embodiments described herein. It will be understood that the workflow 200 of FIG. 2 is provided by way of example and may include any of the features and functionalities discussed above in connection with FIG. 1 and well as additional examples discussed herein.

As shown in FIG. 2, the content collection manager 116 may interact with one or more social networking platforms 202 and access digital content items shared or otherwise hosted thereon. In one or more embodiments, the content collection manager 116 mines social media posts including text content of digital content items. As shown in FIG. 2, the content collection manager 116 may provide a collection of digital content items 204 to the concept extraction manager 118 for further processing. In one or more embodiments, providing the collection of digital content items 204 to the concept extraction manager 118 involves mining text from the digital content items and providing the text content to the concept extraction manager 118 for further processing.

As discussed above, and as further shown in FIG. 2, the concept extraction manager 118 may extract key concepts from the digital content items using one or more extraction models. For example, as indicated above, the concept extraction manager 118 may apply a combination of a rule-based model and a deep learning model to extract key concepts from the text of the digital content items 204 to generate a plurality of key concepts 206 based on outputs of the extraction models. As shown in FIG. 2, the concept extraction manager 118 may provide the plurality of key concepts 206 to the sentiment manager 122 and the classification manager 126. While not shown in FIG. 2, the concept extraction manager 118 may further provide key concepts 206 (and/or information associated therewith) to the graph generation manager 130).

In one or more embodiments, the concept extraction manager 118 simply provides indications of the plurality of key concepts 206 detected in connection with the respective digital content items. For example, in one or more embodiments, the concept extraction manager 118 may provide metadata associated with corresponding digital content items to one or more of the sentiment manager 122, classification manager 126 and/or graph generation manager 130. In one or more embodiments, the concept extraction manager 118 may further provide an indication of the pairs of key concepts that co-occur within the same digital content items.

In one or more embodiments, the concept extraction manager 118 may further provide metrics associated with the occurrence of the key concepts within the digital content items. For example, in one or more embodiments, the concept extraction manager 118 may tally or generate a count of co-occurrences of various pairs of key concepts within the digital content items and provide the counts and associated timing information (e.g., time-stamps) to one of more of the additional components of the graph generation system 108, which may be used in generating the correlation graph object. As will be discussed below, in one or more embodiments, the graph generation manager 130 performs this act associated with accumulating and calculating metrics associated with co-occurrences of various pairs of key concepts in connection with generating the correlation graph object.

As shown in FIG. 2, the collection of digital content items 204 and key concepts 206 may be provided to the sentiment manager 122. As indicated above, the sentiment manager 122 may apply one or more sentiment models to the digital content items to determine sentiment scores associated with the respective digital content items. In one or more embodiments, the sentiment manager 122 determines sentiment scores associated with the key concepts based on a cumulation of sentiment scores determined for digital content items that include the respective key concepts. In one or more embodiments, the sentiment manager 122 generates sentiment scores for pairs of key concepts based on a cumulation of sentiment scores determined for digital content items in which the pairs of key concepts co-occur. As shown in FIG. 2, the sentiment manager 122 may provide sentiment score data 208 to the graph generation manager 130 for use in generating the correlation graph object in accordance with one or more embodiments described herein.

As shown in FIG. 2, the concept extraction manager 118 may provide a plurality of key concepts 206 to the classification manager 126. As further shown, the classification manager 126 may receive a set of candidate terms 210 associated with a domain of interest. Upon receiving the key concepts 206 and candidate terms 210, the classification manager 126 may determine associations 212 between the key concepts 206 and candidate terms 210. For example, in one or more embodiments, the classification manager 126 may determine a candidate term that is associated with each key concept from the plurality of key concepts 206. In one or more embodiments, the classification manager 126 determines the associations 212 between key concepts and respective candidate terms by applying a classification model to the plurality of key concepts 206 and candidate terms 210.

While a variety of classification models may be used in determining associations between key concepts and corresponding candidate terms, in at least one example implementation, the classification manager 126 determines the associations between the key concepts 206 and candidate terms 210 by applying a zero-shot classification model to the key concepts 206 and candidate terms 210. In particular, in one or more embodiments, the classification manager 126 obtains a zero-shot classification model that has been trained on a general knowledge base of terms and concepts to associate terms and concepts with one another. The classification manager 126 may apply the zero-shot classification model to the key concepts 206 extracted from the digital content items and the candidate terms 210 associated with a domain of interest. The zero-shot classification model may output, for each key concept, an association 212 indicating an association between the key concept and one of the set of candidate terms 210.

The classification manager 126 may determine the associations 212 based on estimations or probabilities associated with each of the concepts and candidate terms. Nevertheless, a significant number of concepts extracted from the digital content items may have very little to do with a given set of candidate terms 210 for a domain of interest. Accordingly, in one or more embodiments, the candidate terms 210 may include a non-classification term, such as "other" or "not applicable" that the classification manager 126 may consider in determining the associations 212 for the plurality of key concepts. In categorizing or otherwise grouping the key concepts with the associated candidate terms, the classification manager 126 may associate any of the plurality of key concepts 206 with the non-classification term based on a model of the classification model indicating that a corresponding key concept is not specifically associated with any of the candidate terms 210 for the domain of interest.

By associating a portion of the key concepts with the non-classification term from the candidate terms 210, the classification manager 126 may significantly limit a number of key concepts that the graph generation manager 130 needs to consider in generating a correlation graph object. This act of filtering non-related terms will reduce complexity of the correlation graph object, thus enabling the client device 104 to locally store and process queries that may not be possible otherwise. In addition, this act of filtering non-related terms reduces the number of nodes within the correlation graph object in a way that focuses query results to provide a more relevant query output.

In addition to reducing complexity and size of the correlation graph object, filtering out the non-related key concepts in this way provides significant flexibility in re-using the extracted key concepts in connection with different domains of interest. For example, an entity can modify a set of candidate terms 210 by adding or removing candidate terms without causing the graph correlation system 108 to re-collect and re-extract key concepts from the digital content items. Moreover, a different entity may provide a completely different set of candidate terms to enable the classification manager 126 to determine a new set of associations for the key concepts and different set of candidate terms without requiring that the concept extraction manager 118 re-apply the extraction models to each of the digital content items. Not only does this facilitate determining associations and sentiment values in a non-biased way, this also reduces the likelihood that the digital content items would be sampled or otherwise collected in a biased or otherwise ineffective manner.

As shown in FIG. 2, the graph generation manager 130 may receive information generated and output by the concept extraction manager 118, sentiment manager 122, and classification manager 126. For example, in one or more embodiments, the graph generation manager 130 may receive sentiment score data 208, associations 212 between concepts and candidate terms, and the set of candidate terms 210 for consideration in generating the correlation graph object. As indicated above, the graph generation manager 130 may utilize some or all of the above information and output a correlation graph object 214 including a plurality of nodes connected by a plurality of edges.

In one or more embodiments, the graph generation manager 130 provides the correlation graph object 214 to the graph presentation system 132 for use in processing graph queries. As shown in FIG. 2, responsive to receiving a graph query, the graph presentation manager 132 can generate a graph object presentation 216 including a portion of the correlation graph object 214 based on information provided within a graph query. As shown in FIG. 2, the graph presentation system 132 may provide the graph object presentation for display on a client device 218. As shown in FIG. 2, the graph object presentation 216 may be displayed on a graphical user interface of the client device 220. Additional information in connection with receiving and processing graph queries will be discussed in further detail below.

Figure 3A:
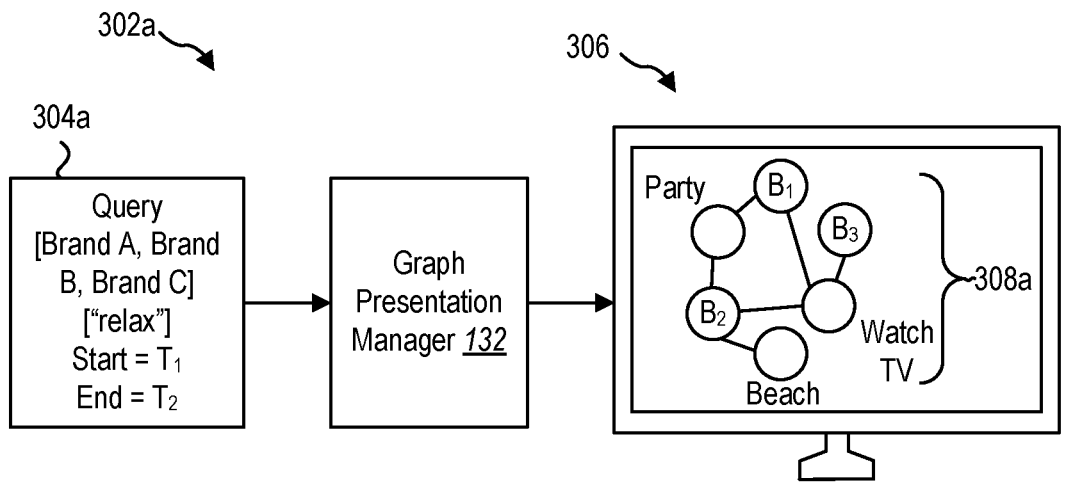
FIGS. 3A-3B illustrates example workflows showing presentations of portions of a graph object in response to graph queries in accordance with one or more embodiments.

FIG. 3A illustrates an example graph query in accordance with one or more embodiments. In particular, FIG. 3A illustrates a first example workflow 302a showing a first example graph query 304a provided to a graph presentation system 132 in accordance with one or more embodiments. As illustrated in FIG. 3A, the first graph query 304a may include a combination of key concepts and candidate terms provided therein. For example, as a first parameter (e.g., a primary parameter), the first graph query 304a may include a plurality of key concepts provided by a user of a client device 306. In this example, the key concepts provided within the first graph query 304a includes a number of brand names ("$B_1$," "$B_2$," "$B_3$"), which may be associated with any number of products and services. These brand names may correspond with key concepts identified within various digital content items.

In addition to the key concepts, the first graph query 304a may further include a second parameter including one or more candidate terms. In this example, the first graph query 304a includes a candidate term of "relax." Accordingly, it may be understood that the individual creating the first graph query 304a is interested in viewing a query graph presentation showing associations between the specific listing of brand names and associated key concepts that are also associated with the candidate term of "relax." As shown in FIG. 3A, in response to receiving the first query 304a, the graph presentation system 132 may apply the query against a correlation graph object generated for a list of candidate terms including the term "relax" to generate and present a first graph presentation 308a on a graphical user interface of the client device 306.

As shown in FIG. 3A, the graph presentation 308a includes a plurality of nodes representing a portion of a correlation graph object based on the graph query 304a. In this example, the graph presentation 308a includes three nodes representative of the three brand names provided in the graph query 304a. In addition, the graph presentation 308a includes additional nodes representative of key concepts associated with the candidate term of "relax." For instance, the graph presentation 308a includes a first node for "party," a second node for "beach," and a third node for "watch TV."

This graph presentation 308a provides a variety of information that is useful to a user of the client device 306. For example, a user may see that both the first and second brands have a high correlation value associated with the key concept of "party." The user may additionally see that each of the three brands have an association with the key concept of "watch TV." The user may also see that a first brand has a unique association with a key concept of "beach" that the second and third brands do not share. As will be discussed in further detail below, a user of the client device 306 may click on one or more of the edges and/or nodes to obtain additional information about the corresponding key concepts and key concept pairs.

As shown in FIG. 3A, the first graph query 304a additionally includes an indicated duration of time. For example, the first graph query 304a may include a start time ($T_1$) and an end time ($T_2$) corresponding to digital content items that should be considered in generating the graph presentation 308a. In this example, therefore, the graph presentation 308a may include correlation values (e.g., weights, sentiment scores) based selectively on digital content items and correlation scores that are associated with time stamps within the indicated duration of time. As mentioned above, and as will be discussed below, this may involve cumulating predetermined correlation values corresponding to sub-ranges of time that fall between the first and second times indicated within the first graph query 304a.

Figure 3B:
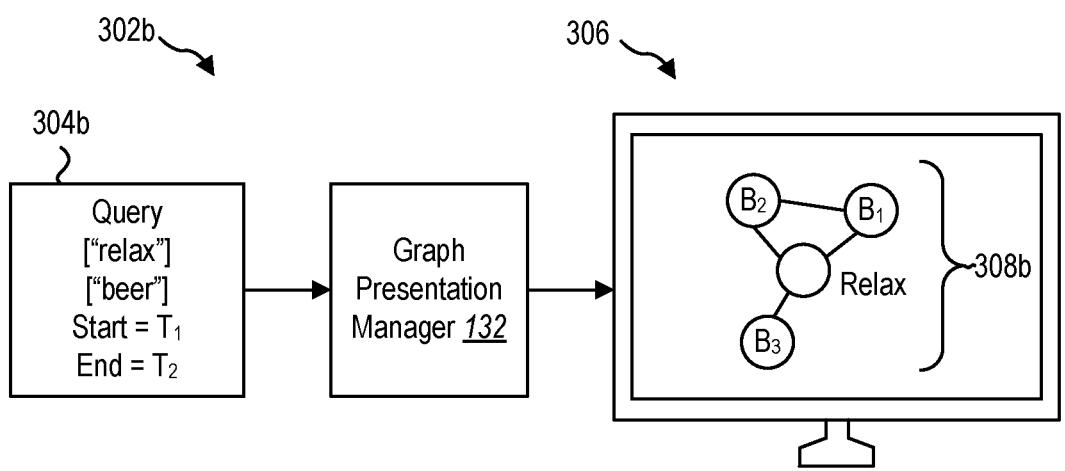

FIG. 3B illustrates another example graph query in accordance with one or more embodiments. In particular, FIG. 3B illustrates a second example workflow 302b showing a second example graph query 304b provided to a graph presentation system 132 in accordance with one or more embodiments. As illustrated in FIG. 3B, the second graph query 304b may include a plurality of candidate terms related to a domain of interest. For example, the second graph query 304a includes a first parameter indicating a first candidate term of "relax" and a second parameter indicating a second candidate term of "beer." Other graph queries may include more than two candidate terms. For example, the first and/or second parameter may include multiple candidate terms (and/or key concepts). Similar to the first graph query 304a, the second graph query 304b may additionally include an indicated duration of time.

As shown in FIG. 3B, the graph query 304b may be provided to the graph presentation manager 132. In response to receiving the second query 304b, the graph presentation manager 132 may apply the query against a correlation graph object to identify key concepts from the correlation graph object that are associated with the candidate term of beer, and which have a high correlation score with respect to key concepts that are associated with the candidate term of relax. To illustrate, in this example, based on the first parameter of "relax," the presentation manager 132 may identify each key concept associated with the candidate term of relax in addition to each key concept associated with the candidate term of beer. The presentation manager 132 may then identify a subset of the key concepts having higher correlation scores between the two groups of key concepts and aggregate the results within the graph presentation 308b, as shown in FIG. 3B. In this example, because "relax" is the primary parameter, the graph presentation 308b may include a node showing the term "relax" and the key concepts identified from aggregating the results of the two identified groups of key concepts.

Similar to the example discussed in connection with FIG. 3A, the graph presentation 308b illustrated in FIG. 3B includes a plurality of nodes representing a portion of a correlation graph object based on the second graph query 304b. In this example, the graph presentation 308b includes a first node corresponding to the candidate term of "relax." As further shown, the graph presentation 308b may include additional nodes corresponding to key concepts of different brands ("$B_1$," "$B_2$," "$B_3$").

Similar to the first graph presentation 308a, the nodes of the graph presentation 308b may be selected by correlation values associated with pairs of key concepts connected by edges within the graph presentation 308b. For instance, in this example, the graph presentation manager 132 may identify the specific set of nodes based on the edges of the graph presentation 308b having higher correlation values (e.g., higher weights and/or sentiment scores) than other edges and associated nodes within the correlation graph object.

FIG. 4 illustrates a further example workflow 400 showing additional features and functionality of the graph generation system 108 in connection with generating a correlation graph object 402 and processing a graph query 404 in accordance with one or more embodiments described herein. In particular, similar to one or more embodiments described herein, the graph presentation manager 132 may receive a graph 404 including some combination of input terms (e.g., key concepts and/or candidate terms) and timing data indicating a relevant range of time. In response to the graph query 404, the graph presentation manager 132 may generate and present a graph presentation 408 via a graphical user interface of a client device 406.

As shown in FIG. 4, in generating the graph presentation 408, the graph presentation manager 132 may run the graph query against a record of correlation data 410 including correlation values (e.g., sentiment scores, edge weights) and various information associated with the nodes and edges of the correlation graph object 402. As shown in FIG. 4, the record of correlation data 410 may include specific edge records corresponding to specific edges within the correlation graph object 402. As an illustrative example, the record of correlation data 410 shows a first edge record 412*a* associated with an edge between a first and second node (e.g., nodes A and B) and a second edge record 412*b* associated with an edge between a second and third node (e.g., nodes B and C). The record of correlation data 410 may include edge records for each pair of key concepts represented by nodes within the correlation graph object 402.

As shown in FIG. 4, each of the edge records 412*a*-*b* may include correlation values associated with individual segments of time. For example, the first edge record 412*a* may include sentiment scores for time segments A-N. These scores may indicate sentiment scores determined by the sentiment manager 122 for digital content items within the respective ranges of time where key concepts A and B co-occur within the digital content items. In addition, the first edge record 412*a* may include weight values indicating a frequency or other quantity of instances in which key concepts A and B co-occurred within the digital content items for the respective ranges of time. Other implementations may include other values for the associated edges within the respective time intervals. Moreover, the edge records may include correlation values for any number of time intervals. As shown in FIG. 4, the second edge record 412*b* may include similar correlation values for the same time intervals.

As shown in FIG. 4, the graph query 404 may indicate a specific duration of time. In this example, the graph presentation manager 132 may identify a selective range of record data 414 based on the duration of time indicated within the graph query 404. In this example, the graph presentation manager 132 identifies a range of record data 414 inclusive of a second interval and a third interval based on the indicated range of time from the graph query 404. Thus, the resulting graph presentation 408 may include edge data and node data based on a slice of the graph query object specific to edge data that has been calculated for the indicated range of time. In this way, the graph presentation manager 132 need not consider edge data outside the indicated range of record data 414. In one or more embodiments, the graph presentation manager 132 simply averages or otherwise accumulates the data for the indicated time range. Because the edge data has been pre-calculated, this enables the graph presentation manager 132 to create and present the graph presentation 408 in a fast and efficient manner. In addition, this enables a user to modify a time range of the graph query 404 to generate updated results in a fast and efficient manner where needed.

As shown in FIG. 4, the graph presentation 408 includes a plurality of nodes and edges based on those nodes and edges that have been identified by the graph presentation manager 132. In one or more embodiments, the graph presentation manager 132 identifies the nodes and edges based on correlation values exceeding a minimum threshold value. In addition, in one or more embodiments, the graph presentation manager 132 may remove one or more nodes or edges based on correlation values exceeding a maximum threshold value. In one or more embodiments, the graph presentation manager 132 may exclude results from the correlation graph object based on correlation values exceeding specific numbers or values. In one or more embodiments, the graph presentation manager 132 excludes results from the highest and lowest percentile of correlation values (e.g., the top and bottom 5 percentiles). In this way, the graph presentation manager 132 may exclude those nodes and edges that are rare and provide minimum utility. In addition, the graph presentation manager 132 may exclude those nodes and edges that have almost universal co-occurrence within the digital content items and similarly provide minimal utility.

As further shown in FIG. 4, the graph presentation 408 may include one or more interactive features that enables a user of the client device 406 to view additional information associated with one or more edges and/or nodes. For example, in one or more embodiments, a user may select an edge and view an edge icon 416 showing correlation values for an associated pair of key concepts. In another example, the graph presentation 408 may select a node and view a nod icon 418 showing the key concept, a candidate term associated with the key concept and any additional data that may be included within the correlation graph object 402.

Figure 5:
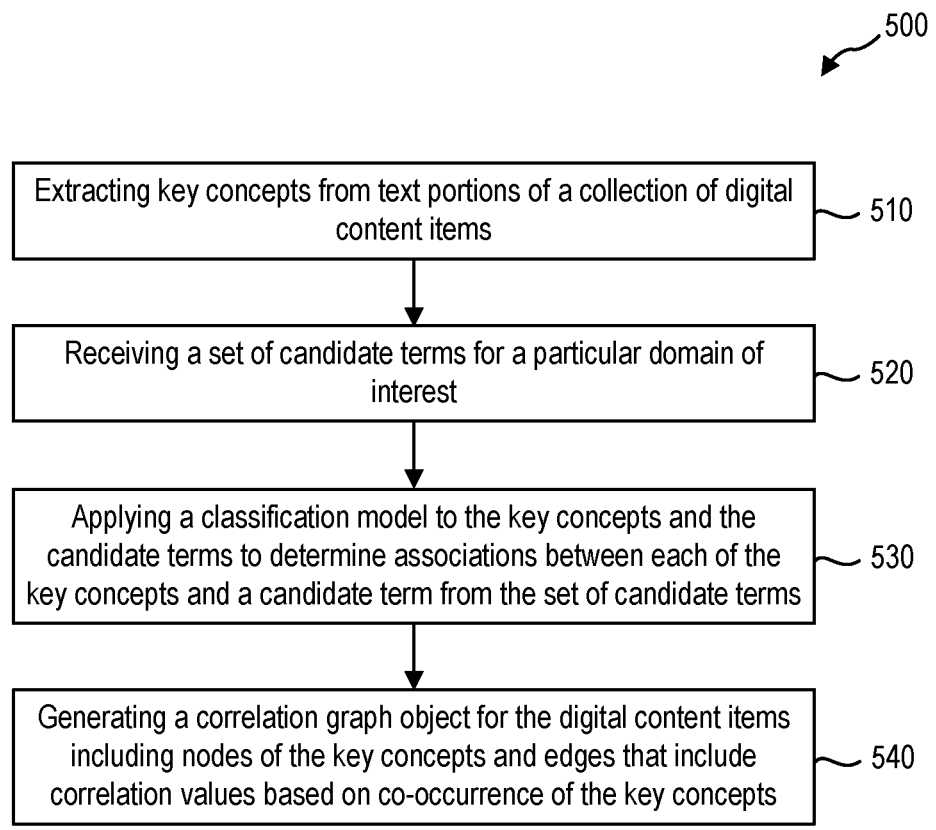
FIG. 5 illustrates an example series of acts for generating and presenting a graph object in accordance with one or more embodiments.

Turning now to FIG. 5, this figure illustrates example flowcharts including series of acts for extracting key concepts from digital content items, associating the key concepts with candidate terms, and generating a correlation graph object based on associations between the key concepts and candidate terms within the digital content items. While FIG. 5 illustrates acts according to one or more embodiments, alternative embodiments may omit, add to, reorder, and/or modify any of the acts shown in FIG. 5. The acts of FIG. 5 can be performed as part of a method. Alternatively, a non-transitory computer-readable medium can include instructions that, when executed by one or more processors, cause a computing device to perform the acts of FIG. 5. In still further embodiments, a system can perform the acts of FIG. 5.

As noted above, FIG. 5 illustrates an example series of acts 500 related to extracting key concepts from digital content items, associating the key concepts with candidate terms, and generating a correlation graph object based on associations between the key concepts and candidate terms within the digital content items. As shown in FIG. 5, the series of acts 500 includes an act 510 of extracting key concepts from text portions of a collection of digital content items. In one or more embodiments, extracting the plurality of key concepts from the collection of digital content items includes mining text content from a collection of social networking posts publicly available from one or more social networking platforms.

As further shown, the series of acts 500 may include an act 520 of receiving a set of candidate terms for a particular domain of interest. For example, in one or more embodiments, the act 520 may involve receiving a set of candidate terms associated with a domain of interest.

As further shown, in one or more embodiments, the series of acts 500 may include an act 530 of applying a classification model to the key concepts and the candidate terms to determine associations between each of the key concepts and a candidate from the set of candidate terms. For example, in one or more embodiments, the act 530 involves applying a classification model to the plurality of key concepts and the set of candidate terms to determine, for each key concept from the plurality of key concepts, a candidate term from the set of candidate terms associated with a respective key concept. In one or more embodiments, the classification model includes a zero-shot classification model having been trained based on training data independent from the set of candidate terms associated with the domain of interest.

As further shown, in one or more embodiments, the series of acts 500 may include an act 540 of generating a correlation graph object for the digital content items including nodes of the key concepts and edges that include correlation values based on co-occurrence of the key concepts. For example, in one or more embodiments, the act 540 involves generating a correlation graph object for the collection digital content items where the correlation graph object includes a plurality of nodes associated with respective key concepts from the plurality of key concepts, each node including an indication of a candidate term from the set of candidate terms associated with a corresponding key concept. Correlation graph object may also include a plurality of edges connecting the plurality of nodes, the plurality of edges being associated with pairs of key concepts corresponding to nodes connected by the respective edges, each edge of the plurality of edges including a correlation value based on frequency of co-occurrence of a respective pair of key concepts within the collection of digital content items.

In one or more embodiments, the series of acts 500 further includes an act of applying a sentiment model to the collection of digital content items to determine sentiment scores for co-occurring concepts from the plurality of key concepts, the sentiment model being trained to determine a sentiment score for a given digital content item. In one or more embodiments, the correlation value(s) is further based on sentiment scores for digital content items within which the respective pair of key concepts co-occurs.

In one or more embodiments, the set of candidate terms includes a first plurality of terms related to domain of interest and a non-classification term not related to the domain of interest. In this example, the classification model may associate a subset of key concepts from the plurality of key concepts with the non-classification term. In one or more embodiments, the subset of key concepts are excluded from the correlation graph object based on association with the non-classification term by the classification model.

In one or more embodiments, extracting the key concepts from the collection of digital content items includes applying a first model to text content of the collection of digital content items to identify a first set of terms from the text content, the first model comprising a rule-based model including rules for identifying certain types of terms within the text content of the collection of digital content items. Extracting the key concepts may further include applying a second model to the text content to identify the set of candidate terms from the first set of terms, the second model comprising a machine learning model trained to identify one or more key topics within given text based on the given text and one or more terms within the given text indicated as one or more certain types of terms.

In one or more embodiments, the series of acts 500 may include an act of receiving a graph query including one or more key concepts and a candidate term. In this example, the series of acts 500 may further include an act of providing a presentation of a portion of the correlation graph object including a first subset of nodes from the plurality of nodes corresponding to the one or more key concepts and a second subset of nodes associated with other key concepts, the second subset of nodes being determined based on correlation values for respective edges that connect the second subset of nodes to the first subset of nodes within the correlation graph object.

In one or more embodiments, the series of acts 500 may include an act of receiving a graph query including one or more candidate terms. In this example, the series of acts 500 may further include an act of providing a presentation of a portion of the correlation graph object including a set of nodes from the plurality of nodes with key concepts associated with the one or more candidate terms.

In one or more embodiments, the series of acts 500 further includes an act of receiving a query including an indicated range of time. In one or more embodiments, the series of acts 500 may include an act of providing a presentation of the correlation graph object including nodes and associated edges based on correlation values determined for the indicated range of time. In one or more embodiments, the correlation value is based on a plurality of pre-calculated segment correlation values for associated segments of time, the plurality of pre-calculated segment correlation values being based on frequency of co-occurrence of respective pairs of key concepts within subsets of the collection of digital content items associated with the respective segments of time. In one or more embodiments, the segments of time include predetermined durations of time. The indication range of time may further include a selection of one or more segments of time within a duration of time inclusive of the collection of digital content items.

In one or more embodiments, the act of generating the correlation graph includes excluding edges for a first set of pairs of key concepts from the correlation graph object based on co-occurrence of the first set of key concepts co-occurring less than a minimum threshold value within the collection of digital content items. The act of generating the correlation graph may further include excluding edges for a second set of pairs of key concepts from the correlation graph object based on co-occurrence of the second set of key concepts co-occurring greater than a maximum threshold value within the collection of digital content items. In one or more embodiments, the minimum threshold value is a first threshold percentile. In one or more embodiments, the maximum threshold value is a second threshold percentile.

Figure 6:
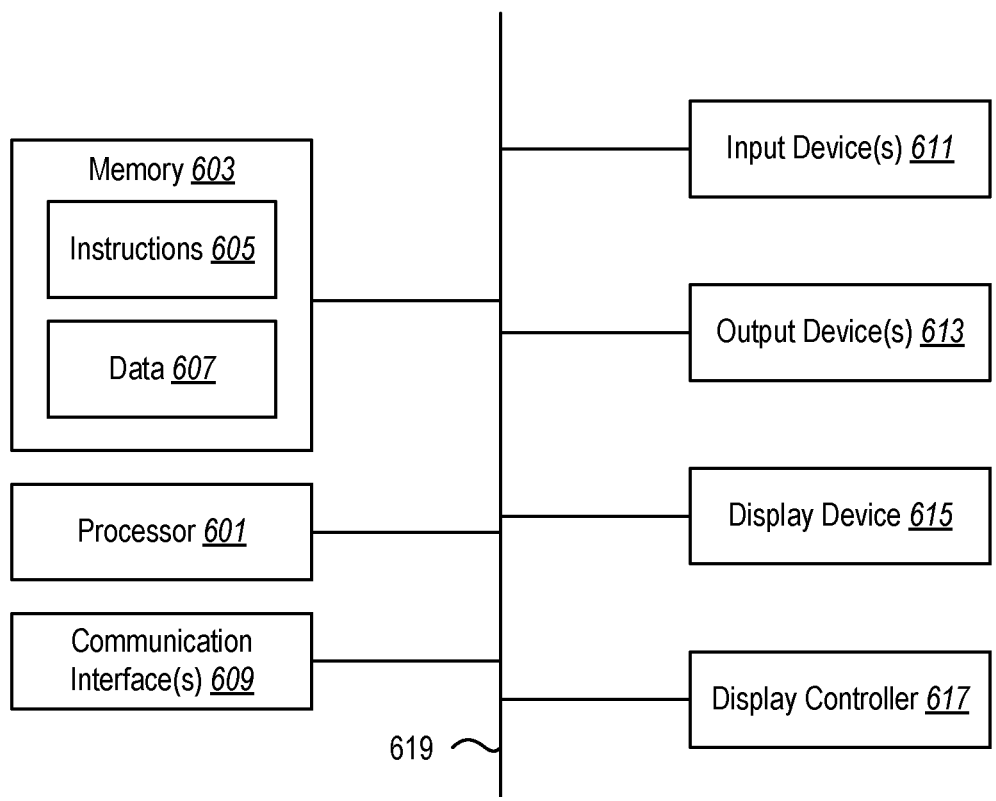
FIG. 6 certain components that may be included within a computer system.

FIG. 6 illustrates certain components that may be included within a computer system 600. One or more computer systems 600 may be used to implement the various devices, components, and systems described herein.

The computer system 600 includes a processor 601. The processor 601 may be a general-purpose single- or multi-chip microprocessor (e.g., an Advanced RISC (Reduced Instruction Set Computer) Machine (ARM)), a special-purpose microprocessor (e.g., a digital signal processor (DSP)), a microcontroller, a programmable gate array, etc. The processor 601 may be referred to as a central processing unit (CPU). Although just a single processor 601 is shown in the computer system 600 of FIG. 6, in an alternative configuration, a combination of processors (e.g., an ARM and DSP) could be used. In one or more embodiments, the computer system 600 further includes one or more graphics processing units (GPUs), which can provide processing services related to both entity classification and graph generation.

The computer system 600 also includes memory 603 in electronic communication with the processor 601. The memory 603 may be any electronic component capable of storing electronic information. For example, the memory 603 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 605 and data 607 may be stored in the memory 603. The instructions 605 may be executable by the processor 601 to implement some or all of the functionality disclosed herein. Executing the instructions 605 may involve the use of the data 607 that is stored in the memory 603. Any of the various examples of modules and components described herein may be implemented, partially or wholly, as instructions 605 stored in memory 603 and executed by the processor 601. Any of the various examples of data described herein may be among the data 607 that is stored in memory 603 and used during execution of the instructions 605 by the processor 601.

A computer system 600 may also include one or more communication interfaces 609 for communicating with other electronic devices. The communication interface(s) 609 may be based on wired communication technology, wireless communication technology, or both. Some examples of communication interfaces 609 include a Universal Serial Bus (USB), an Ethernet adapter, a wireless adapter that operates in accordance with an Institute of Electrical and Electronics Engineers (IEEE) 802.11 wireless communication protocol, a Bluetooth wireless communication adapter, and an infrared (IR) communication port.

A computer system 600 may also include one or more input devices 611 and one or more output devices 613. Some examples of input devices 611 include a keyboard, mouse, microphone, remote control device, button, joystick, trackball, touchpad, and lightpen. Some examples of output devices 613 include a speaker and a printer. One specific type of output device that is typically included in a computer system 600 is a display device 615. Display devices 615 used with embodiments disclosed herein may utilize any suitable image projection technology, such as liquid crystal display (LCD), light-emitting diode (LED), gas plasma, electroluminescence, or the like. A display controller 617 may also be provided, for converting data 607 stored in the memory 603 into text, graphics, and/or moving images (as appropriate) shown on the display device 615.

The various components of the computer system 600 may be coupled together by one or more buses, which may include a power bus, a control signal bus, a status signal bus, a data bus, etc. For the sake of clarity, the various buses are illustrated in FIG. 6 as a bus system 619.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular datatypes, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
   extracting a plurality of key concepts from a collection of digital content items, wherein extracting the plurality of key concepts includes:
   applying a first model to text content of the collection of digital content items to identify a first set of terms from the text content, the first model comprising a rule-based model including rules for identifying certain types of terms within the text content of the collection of digital content items; and
   applying a second model to the text content to identify a set of candidate terms from the first set of terms, the second model comprising a machine learning model trained to identify one or more key topics within a given text based on the given text and one or more terms within the given text indicated as one or more certain types of terms;
   receiving the set of candidate terms associated with a domain of interest by way of a graph query application over a network;
   applying a zero-shot classification model to the plurality of key concepts and the set of candidate terms to determine, for each key concept from the plurality of key concepts, a candidate term from the set of candidate terms associated with a respective key concept; and
   generating a correlation graph object for the collection of digital content items, the correlation graph object including:
   a plurality of nodes associated with respective key concepts from the plurality of key concepts, each node including an indication of a candidate term from the set of candidate terms associated with a corresponding key concept; and
   a plurality of edges connecting the plurality of nodes, the plurality of edges being associated with pairs of key concepts corresponding to nodes connected by the respective edges, each edge of the plurality of edges including a correlation value based on a plurality of pre-calculated segment correlation values for associated segments of time, the plurality of pre-calculated segment correlation values based on frequency of co-occurrence of a respective pair of key concepts within subsets of the collection of digital content items associated with the respective segments of time.

2. The method of claim 1, further comprising:
applying a sentiment model to the collection of digital content items to determine sentiment scores for co-occurring concepts from the plurality of key concepts, the sentiment model being trained to determine a sentiment score for a given digital content item,
wherein the correlation value is further based on sentiment scores for digital content items within which the respective pair of key concepts co-occurs.

3. The method of claim 1, wherein the zero-shot classification model comprises a zero-shot classification model having been trained based on training data independent from the set of candidate terms associated with the domain of interest.

4. The method of claim 1, wherein the set of candidate terms includes a first plurality of terms related to a domain of interest and a non-classification term not related to the domain of interest, wherein the zero-shot classification model associates a subset of key concepts from the plurality of key concepts with the non-classification term.

5. The method of claim 4, wherein the subset of key concepts are excluded from the correlation graph object based on association with the non-classification term by the zero-shot classification model.

6. The method of claim 1, further comprising:
receiving a graph query including one or more key concepts and a candidate term; and
providing a presentation of a portion of the correlation graph object including a first subset of nodes from the plurality of nodes corresponding to the one or more key concepts and a second subset of nodes associated with other key concepts, the second subset of nodes being determined based on correlation values for respective edges that connect the second subset of nodes to the first subset of nodes within the correlation graph object.

7. The method of claim 1, further comprising:
receiving a graph query including one or more candidate terms; and
providing a presentation of a portion of the correlation graph object including a set of nodes from the plurality of nodes with key concepts associated with the one or more candidate terms.

8. The method of claim 1, further comprising:
receiving a query including an indicated range of time; and
providing a presentation of the correlation graph object including nodes and associated edges based on correlation values determined for the indicated range of time.

9. The method of claim 1, wherein the collection of digital content items comprise text content and visual content.

10. The method of claim 8, wherein the segments of time include predetermined durations of time, and wherein the indicated range of time includes a selection of one or more segments of time within a duration of time inclusive of the collection of digital content items.

11. The method of claim 1, wherein generating the correlation graph object includes:
excluding edges for a first set of pairs of key concepts from the correlation graph object based on co-occurrence of the first set of key concepts co-occurring less than a minimum threshold value within the collection of digital content items; and
excluding edges for a second set of pairs of key concepts from the correlation graph object based on co-occurrence of the second set of key concepts co-occurring greater than a maximum threshold value within the collection of digital content items.

12. The method of claim 11, wherein the minimum threshold value is a first threshold percentile, and wherein the maximum threshold value is a second threshold percentile.

13. The method of claim 1, wherein extracting the plurality of key concepts from the collection of digital content items includes mining text content from a collection of social networking posts publicly available from one or more social networking platforms.

14. A system, comprising:
one or more processors;
memory in electronic communication with the one or more processors; and instructions stored in the memory, the instructions being executable by the one or more processors to:
extract a plurality of key concepts from a collection of digital content items, wherein extracting the plurality of key concepts includes:
applying a first model to text content of the collection of digital content items to identify a first set of terms from the text content, the first model comprising a rule-based model including rules for identifying certain types of terms within the text content of the collection of digital content items; and
applying a second model to the text content to identify a set of candidate terms from the first set of terms, the second model comprising a machine learning model trained to identify one or more key topics within a given text based on the given text and one or more terms within the given text indicated as one or more certain types of terms;
receive the set of candidate terms associated with a domain of interest by way of a graph query application over a network;
apply a zero-shot classification model to the plurality of key concepts and the set of candidate terms to determine, for each key concept from the plurality of key concepts, a candidate term from the set of candidate terms associated with a respective key concept; and
generate a correlation graph object for the collection of digital content items, the correlation graph object including:
a plurality of nodes associated with respective key concepts from the plurality of key concepts, each node including an indication of a candidate term from the set of candidate terms associated with a corresponding key concept; and
a plurality of edges connecting the plurality of nodes, the plurality of edges being associated with pairs of key concepts corresponding to nodes connected by the respective edges, each edge of the plurality of edges including a correlation value based on a plurality of pre-calculated segment correlation values for associated segments of time, the plurality of pre-calculated segment correlation values based on frequency of co-occurrence of a respective pair of key concepts within subsets of the collection of digital content items associated with the respective segments of time.

15. The system of claim 14, wherein the zero-shot classification model comprises a zero-shot classification model having been trained based on training data independent from the set of candidate terms associated with the domain of interest.

16. The system of claim 14, further comprising instructions being executable by the one or more processors to:
receive a graph query including one or more key concepts and a candidate term; and
provide a presentation of a portion of the correlation graph object including a first subset of nodes from the plurality of nodes corresponding to the one or more key concepts and a second subset of nodes associated with other key concepts, the second subset of nodes being determined based on correlation values for respective edges that connect the second subset of nodes to the first subset of nodes within the correlation graph object.

17. The system of claim 14, further comprising instructions being executable by the one or more processors to:
receive a graph query including one or more candidate terms; and
provide a presentation of a portion of the correlation graph object including a set of nodes from the plurality of nodes with key concepts associated with the one or more candidate terms.

18. A non-transitory computer readable medium storing instructions thereon that, when executed by one or more processors, causes a computing device to:
extract a plurality of key concepts from a collection of digital content items, wherein extracting the plurality of key concepts includes:
applying a first model to text content of the collection of digital content items to identify a first set of terms from the text content, the first model comprising a rule-based model including rules for identifying certain types of terms within the text content of the collection of digital content items; and
applying a second model to the text content to identify a set of candidate terms from the first set of terms, the second model comprising a machine learning model trained to identify one or more key topics within a given text based on the given text and one or more terms within the given text indicated as one or more certain types of terms;
receive the set of candidate terms associated with a domain of interest by way of a graph query application over a network;
apply a zero-shot classification model to the plurality of key concepts and the set of candidate terms to determine, for each key concept from the plurality of key concepts, a candidate term from the set of candidate terms associated with a respective key concept; and
generate a correlation graph object for the collection of digital content items, the correlation graph object including:
a plurality of nodes associated with respective key concepts from the plurality of key concepts, each node including an indication of a candidate term from the set of candidate terms associated with a corresponding key concept; and
a plurality of edges connecting the plurality of nodes, the plurality of edges being associated with pairs of key concepts corresponding to nodes connected by the respective edges, each edge of the plurality of edges including a correlation value based on a plurality of pre-calculated segment correlation values for associated segments of time, the plurality of pre-calculated segment correlation values based on frequency of co-occurrence of a respective pair of key concepts within subsets of the collection of digital content items associated with the respective segments of time.

19. The non-transitory computer readable medium of claim 18, wherein the zero-shot classification model comprises a zero-shot classification model having been trained based on training data independent from the set of candidate terms associated with the domain of interest.

* * * * *